United States Patent [19]

Girgis

[11] Patent Number: 4,933,964
[45] Date of Patent: Jun. 12, 1990

[54] PACING OF TELEPHONE CALLS FOR CALL ORIGINATION MANAGEMENT SYSTEMS

[75] Inventor: Bassem M. Girgis, Burke, Va.

[73] Assignee: International Telesystems Corporation, Herndon, Va.

[21] Appl. No.: 385,015

[22] Filed: Jul. 25, 1989

[51] Int. Cl.$^5$ .................. H04M 1/276; H04M 3/46
[52] U.S. Cl. ...................................... 379/67; 379/69; 379/216
[58] Field of Search ..................... 379/67, 88, 92, 69, 379/216, 218

[56] References Cited

U.S. PATENT DOCUMENTS

| | | | |
|---|---|---|---|
| 4,599,493 | 7/1986 | Cave | 379/247 |
| 4,797,911 | 1/1989 | Szlam et al. | 379/67 |
| 4,817,130 | 3/1989 | Frimmel, Jr. | 379/88 |

Primary Examiner—Thomas W. Brown
Attorney, Agent, or Firm—Whitham & Marhoefer

[57] ABSTRACT

An adaptive pacing algorithm based on a statistical analysis of the times of calls is used to determine when and how many calls to dial in a call origination management system. This pacing algorithm determines the number of calls to dial as an inverse function of the mean time of all calls and the standard deviation multiplied by a first constant. This first constant is a function of the ratio of nuisance calls to the number of call attempts and is not defined as a mathematical function but is, instead, determined experimentally to be ±0.25 of the standard deviation and varies depending on how far the ratio of nuisance calls deviates from a set level. The number of calls to dial is also an inverse function of a second constant times the ratio of the answered calls to the call attempts per session minus the maximum allowable nuisance calls. This second constant is itself a function of the mean time, ratio of answered calls to the number of call attempts during the session and the ratio of nuisance calls to the number of call attempts, but is has been determined empirically. As the session progresses, new values of the ratio of answered calls to attempts per session, the mean time and the standard deviation are computed, and these new values are used in determining the number of calls to dial.

18 Claims, 18 Drawing Sheets

24 — MEMO _____

20 — NAME _____
SPOUSE NAME _____
ADDRESS _____
ADDRESS _____
CITY _____ ST ____ ZIP ____
HOME PHONE ( ) - _____

26 — PMT TYPE _____
CREDIT CARD TYPE: AMERICAN EXPRESS ____ VISA ____ MASTERCARD ____
CARD NUMBER _____
EXP DATE _____

22 — OPERATOR ID ____ DATE OF CALL _____ TIME OF DAY _____

FIG. 2

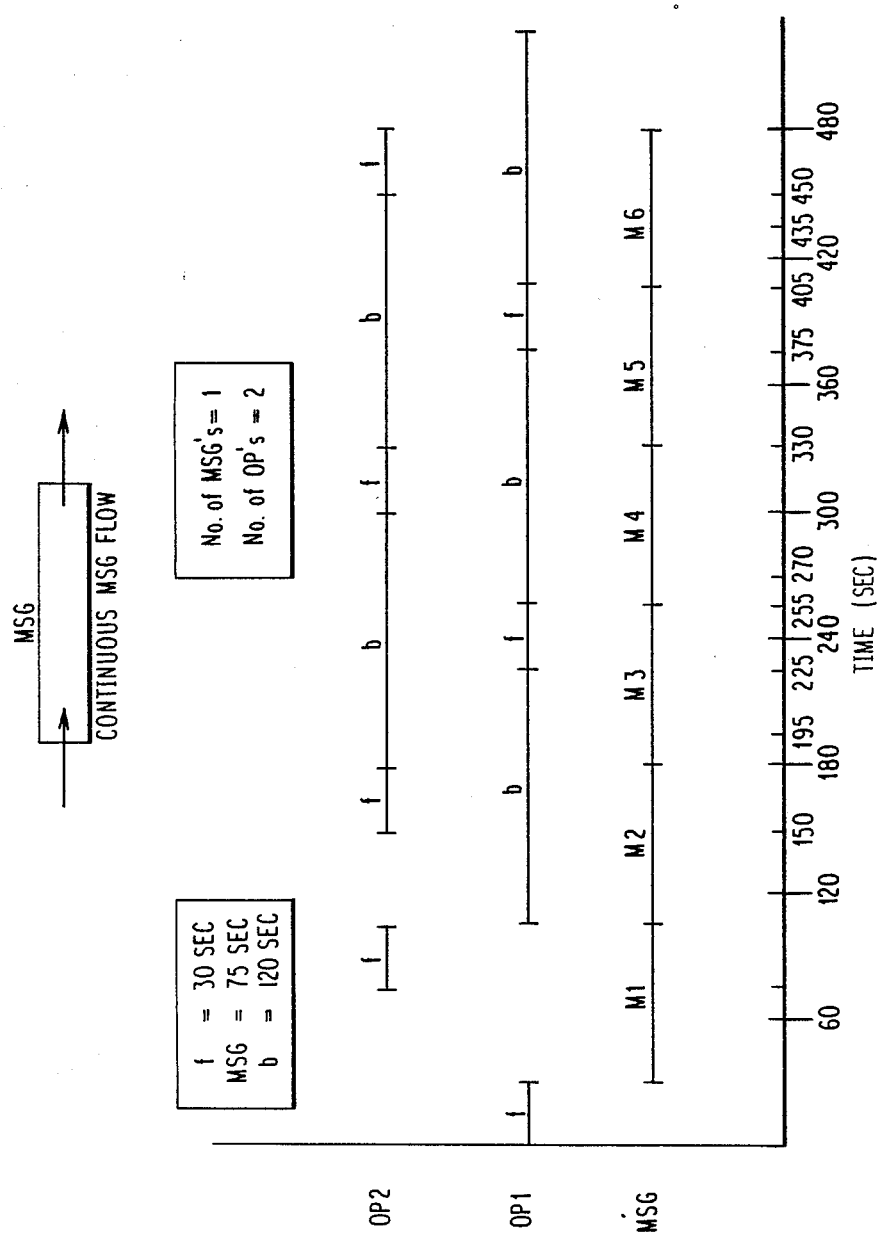
FIG. 16  TIME DIAGRAM FOR FRONT AND BACK "CONTINUITY MODEL"

PACING OF TELEPHONE CALLS FOR CALL ORIGINATION MANAGEMENT SYSTEMS

BACKGROUND OF THE INVENTION

Field of the Invention

The present invention generally relates to call origination management systems of the type wherein telephone calls are automatically dialed and, when a call results in an answer, transferred to an available operator. More particularly, the invention is directed to an improved pacing system which regulates the rate at which calls are dialed to maximize the time an operator talks to clients and to minimize the number of answered calls for which there is no operator available.

Description of the Prior Art

Automated calling systems which dial clients, listens for the call result (i.e., ringing, busy signal, answer, no answer, etc.), and when a call results in an answer, automatically transfers the call to an available operator are in general use today by a variety of businesses, groups and organizations. For example, banks and other creditors use these systems for debt collection, publishers use them for soliciting subscriptions, and charitable and political organizations use them to promote their causes and solicit funds. In all these cases, the client contact is by an operator whose job is to deliver the message, answer questions and input data to the system. The purposes of such call origination management systems are to automate the process of calling clients and to process the data input in the course of a call with a client, thereby increasing the productivity of the operators.

FIG. 1 shows a system overview of one such system. The heart of the system is a main system unit 10, which typically includes central processing unit (CPU), telephone line control unit (LCU), hard disk storage 11, and a tape drive 12. A plurality of outbound telephone lines 13 are connected to the system unit 10. The number n of these outbound telephone lines typically is on the order of 48, but may be more or less depending on the specific application. A plurality of voice and data terminal stations 14 are also connected to the system unit 10. The number m of these voice and data terminal stations may be, for example, 24 for the case where the number n of the telephone lines is 48. In other words, the number m of the voice and data terminals is less than the number of telephone lines. This allows the system unit 10 to dial calls while all operators are busy talking to clients.

As illustrated in FIG. 1, each of the voice and data terminal stations comprises a combination video display terminal (VDT) and keyboard 15 and a telephone headset and microphone 16. FIG. 2 illustrates a typical operator screen as displayed by the video display terminal. When a call is transferred to an operator, a portion of this screen will already have been filled in by the CPU in the main system unit 10. Specifically, section 20 of the screen providing the name, address and telephone number of the client will have been filled in so that the operator knows immediately who has been called. During the course of the conversation, the operator may confirm the data and, if necessary, make corrections using the keyboard. Section 22 of the screen is also filled in automatically by the CPU based on the login data from the operator at the beginning of the campaign and the CPU's clock and calendar. The top portion 24 of the screen is available to be filled in by the operator with any pertinent information from the contact with the client. In addition, where a bill is to be paid or a pledge made that is to be charged to a credit card, the operator would fill in portion 26 of the screen during the call.

FIG. 3 illustrates the data flow of the system. The first step in beginning a calling campaign is to obtain the calling data, typically via tapes 30, disks 31 or through a communication link to a host computer 32. The data is input at 33, and the system then organizes the data into the records for the campaign. When the campaign is started, the data is loaded into the "input call list", as indicated at 34. The system then preloads a dialing queue 35 with a certain number of records from the calling data. As the dialing process begins, the system manages the number of calls being made at any one time based on the number of operators that are available to receive calls. When a connection is established to a client, the system routes the call to an available operator and displays the client's record on the operator screen. The operator is now ready to make the presentation to the client and record information from the transaction on the display screen. Once the operator completes the call, he or she presses a designated key on the keyboard to record the status of the contact and terminate the call. The system then makes the operator station available for another call.

After the operator has pressed the designated key, the system validates the client's record in an output call list 36, and, depending on the outcome of the call, separates the record in the corresponding output file at 37. For example, if the particular person to be contacted is not at home, the operator may press a key telling the system to place the client's record into the call-back file 38. When, for example, a call results in a future follow-up call, the operator presses another key to immediately print information of the transaction on a printer, as indicated at 39. Records which require no further action (i.e., a sale is made, wrong number, etc.) are marked complete and are not put into the call-back file but instead are put in a sale file 40.

When all the numbers have been exhausted in the campaign list, the system automatically begins a statistical analysis of both operator and campaign performance, as indicated at 41. Finally, a closeout function 42 is performed during which all relevant data of the campaign is written to a tape 43 or disk 44 or transmitted to a host computer 45.

A key to the successful operation of a call origination management system of the type described is the pacing algorithm which calculates the number of calls to dial and the best estimate of the time when to dial them. In the prior Trunk Operation Management System (TOMS), which is a predictive outbound dialing system, the dialer uses a pacing algorithm based on cumulative statistics that are periodically refreshed. The goal of this system is to maximize efficiency, as measured by the amount of talk time with clients, with a minimum number of resources (i.e., the telephone trunk lines) while at the same time minimizing the number of nuisance calls. Nuisance calls are those calls that result in an answer by a client but, because an operator was unavailable, the system must hang up on the client.

An example of this prior system is described in application Ser. No. 07/027,359 filed by Douglas A. Samuelson on Mar. 18, 1987, and assigned to the assignee of this application, now Pat. No. 4,858,120. The Samuelson system analyzed the problem based on queuing theory, which is not actually applicable in a call origination system since the system has control of when telephone numbers are dialed. Samuelson did attempt to statistically analyze various parameters of the calling process and, based on that analysis, predict the number of calls and when the calls should be made. However, in practice, it has been found that the system, while working well for some applications, worked poorly in other applications. That is, in some cases, the efficiency was high and the number of nuisance calls acceptably low, while in other cases, the efficiency was either low or the number of nuisance calls were unacceptably high or both.

SUMMARY OF THE INVENTION

It is therefore a general object of the present invention to provide an improved pacing algorithm for telephone call origination management systems.

It is a another object of the invention to provide an adaptive pacing algorithm based on a statistical analysis of the times of calls to determine when and how many calls to dial.

It is further object of the invention to provide a nonqueuing call origination management system in which the efficiency of operation is significantly increased while at the same time the number of nuisance calls is dramatically reduced.

Yet another object of the invention is to provide an improved pacing algorithm for a call origination management system which can be tailored to specific applications.

According to one aspect of the invention, a nonqueuing pacing algorithm has been developed based on statistical analyses of call origination management systems. This nonqueuing pacing algorithm determines the number of calls to dial as an inverse function of the mean time of all calls and the standard deviation multiplied by a first constant. This first constant is a function of the ratio of nuisance calls to the number of call attempts and is not defined as a mathematical function but is, instead, determined experimentally to be ±0.25 of the standard deviation and varies depending of how far the ratio of nuisance calls deviates from a set level. The number of calls to dial is also an inverse function of a second constant times the ratio of the answered calls to the call attempts per session minus the maximum allowable nuisance calls. This second constant is itself a function of the mean time, ratio of answered calls to the number of call attempts during the session and the ratio of nuisance calls to the number of call attempts, but it has been determined empirically.

The basic nonqueuing algorithm according to the first aspect of the invention may be applied to queuing call origination management systems to obtain improved results. In queuing systems, there are by definition no nuisance calls. Instead, answered calls for which no operator is available are routed to a source of a recorded message. It is desireable, however, in such queuing systems to minimize the number of answered calls which must be routed to the source of a recorded message and, therefore, the techniques of the basic algorithm are directly applicable to queuing call origination management systems. The waiting time in the queue is directly related to the number of answered calls which are routed to the source of a recorded message; i.e., the higher the number of clients on hold the longer a client will be on hold and the higher the probability of a client hanging up while on hold. The number of clients on hold is subtracted from the calculated number of calls to dial.

The basic algorithm and another algorithm are useful in front and back call origination managements systems. Such systems are especially useful for soliciting donations to charitable and political organizations and employ "front" operators who make the initial contact with clients. The front operators identify the campaign and ask the client whether they would be willing to listen to a recorded message from, say, their Senator or other important individual. If they get an affirmative response, the front operator switches the call to a source of recorded message, and the front operator is then connected to the next answered call. At the end of the recorded message, the call management system switches the client to a "back" operator who then solicits a contribution or pledge, taking credit card and other pertinent information from the client. For the sake of simplicity, this description assumes designated "front" and "back" operators, but in practice, any operator may work either as a front or back operator as determined by the call management system.

Because of the nature of the campaign, the call origination management system, as a practical matter, should be a nonqueuing system for generating the calls to the front operators; however, there are applications where the call origination management system may be a queuing system. Thus, the basic pacing algorithm according to the invention, with or without queuing, is used for placing the calls to be handled by the front operators. The connect time for the front operators is, by its nature, uniformly quite brief, and the algorithm is adjusted accordingly. The connect time for the back operators, however, is much longer and less predictable. Therefore, a new algorithm, based on a continuity model, has been developed to account for the clients in the "queue" listening to the recorded message. If there is no restriction on the operators handling any type of calls (front or back), the algorithm calculates the number of calls to be dialed based on the number of front and back operators who are expected to become free.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is an illustration of a typical screen which may be displayed on a video display terminal for viewing and filling in by an operator;

FIG. 16 is a timing diagram illustrating the operation of the continuity model on which the front and back algorithm according to the invention is based.

DETAILED DESCRIPTION OF A PREFERRED EMBODIMENT OF THE INVENTION

In the following description, the following terms are used. Definitions are provided next to each of the terms.

$A_{ratio}$ is the ratio of answered calls to the number of call attempts per session.

$CONN_{ratio}$ is the ratio of calls connected to an operator to the number of call attempts per session. Note that this ratio is typically different from $A_{ratio}$ since all calls which are answered may not be connected to an operator if an operator is unavailable when the call is answered.

$CON_{time}$ is the average conversation time per call per session, measured in seconds.

$LO_{ratio}$ is the number of lines (trunks) divided by the number of operators (stations).

N is the average number of lines to dial on all the time.

$N_{inprogress}$ is the number of calls currently in progress. Note that this number is included in N and must be taken into account when new calls are to be dialed.

$NOP_{max}$ is the maximum ratio of no operator available (i.e., nuisance) calls to call attempts.

$NOP_{ratio}$ is the number of nuisance calls (no operators available) divided by the number of call attempts.

$OP_{num}$ is the number of operators logged into the system.

$T_{setup}$ is the average time to complete a call attempt.

$T_{talk}$ is the average talk time per hour per operator, measured in minutes.

The goal of any call origination management system is to have each operator connected to each call answered. Under these conditions, there would be maximum talk time and no nuisance calls. To accomplish this, however, requires a priori knowledge of the time it takes to connect a call and exactly how long each operator talks. In practice both of these can be highly variable, within limits. The system can not predict exactly when or if a placed call will result in an answer and, of course, the amount of time an operator talks will depend on the responses of the client. Therefore, scheduling the next answered call to occur exactly when an operator finishes talking is impossible. An answer may occur before or after the operator finishes the previous call, and the result is an increase in the nuisance call rate or an increase in operator idle time or both. Intuitively, it is clear that the system variables which affect talk time are $A_{ratio}$ and $CON_{time}$ and the goal to achieve optimization (maximum efficiency) is maximum talk time per operator with a minimum of nuisance calls.

Figure 1:
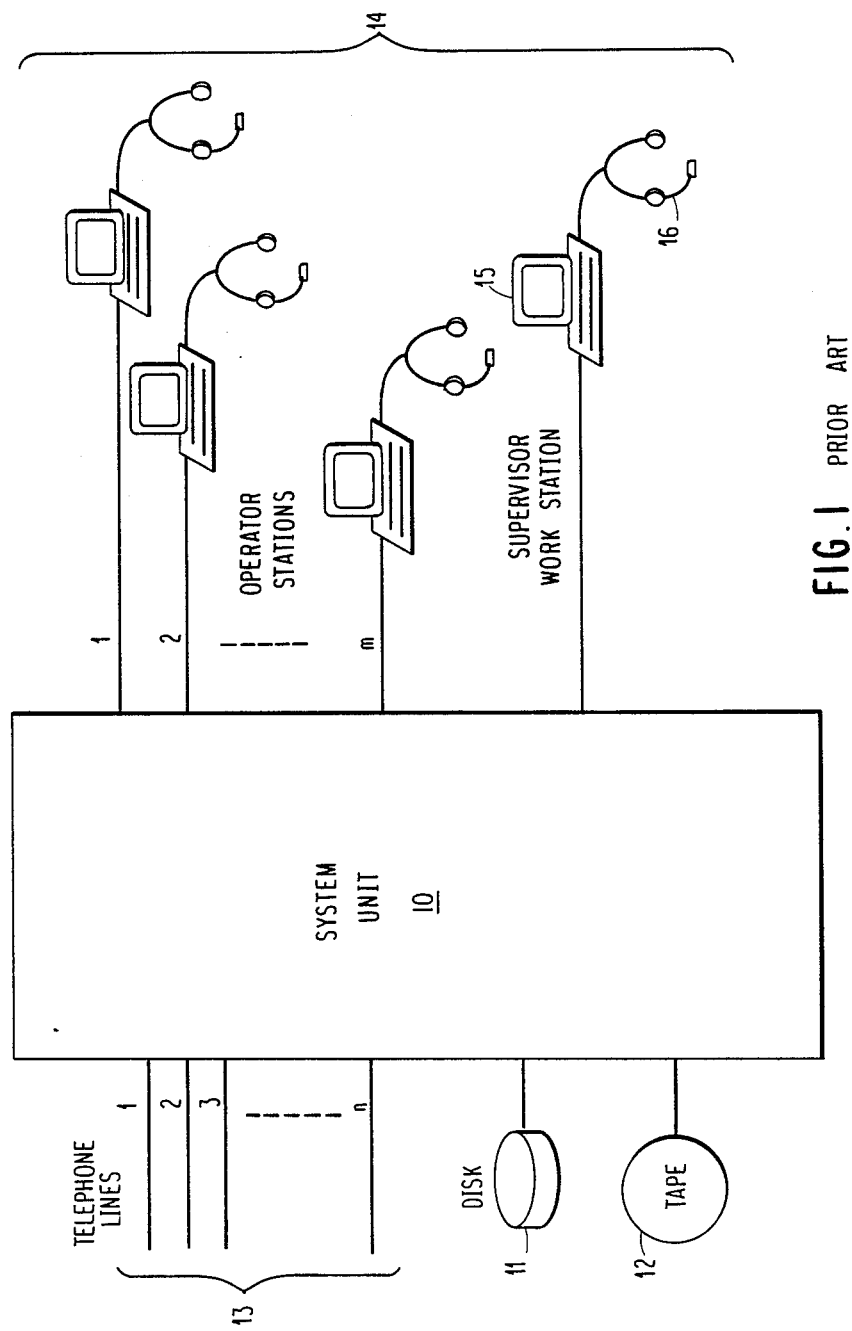
FIG. 1 is a high level block diagram showing an overview of a typical telephone call origination management system.
Figure 3:
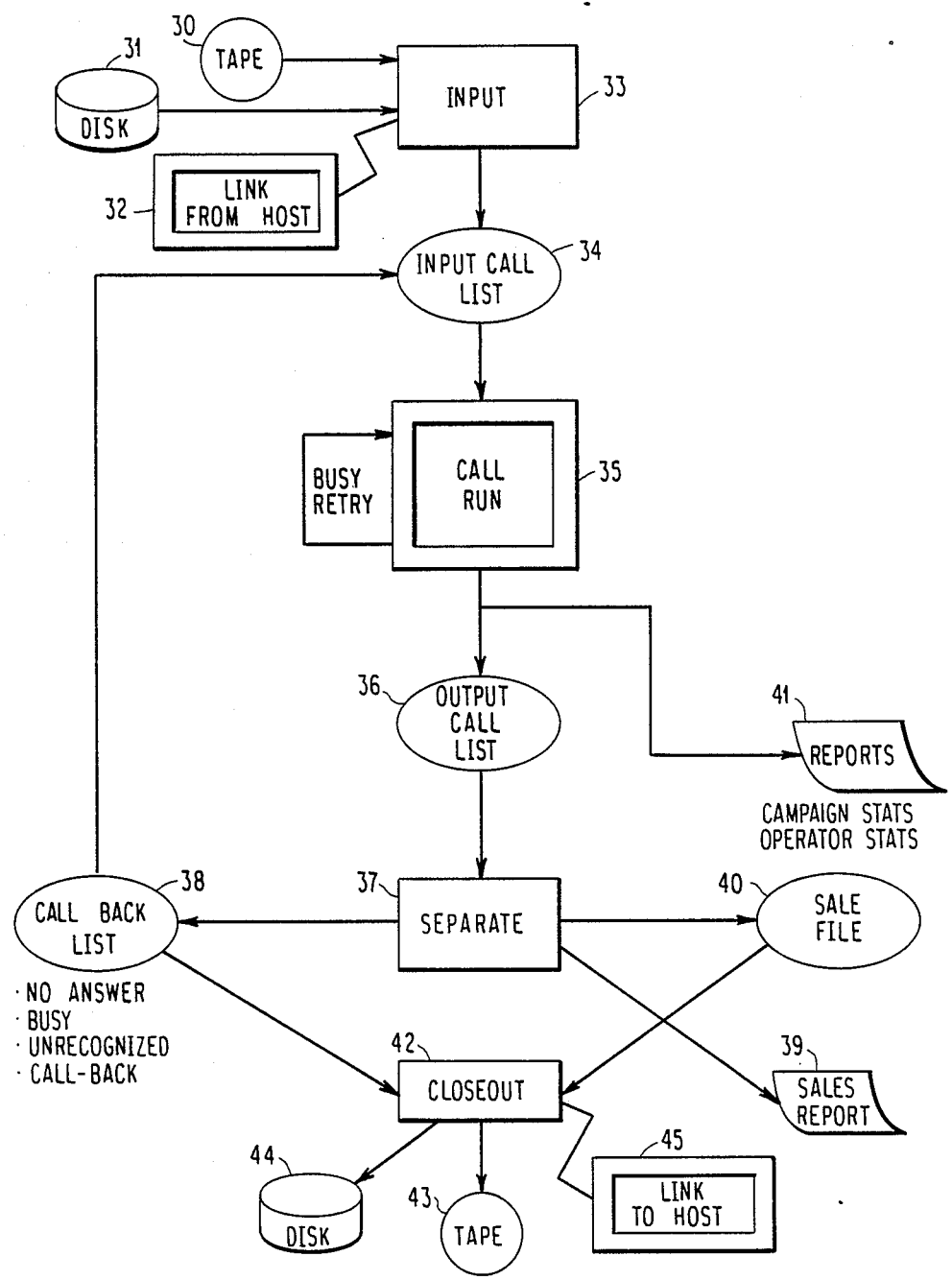
FIG. 3 is a data flow diagram illustrating the processes performed by the telephone call origination management system of FIG. 1.
Figure 4:
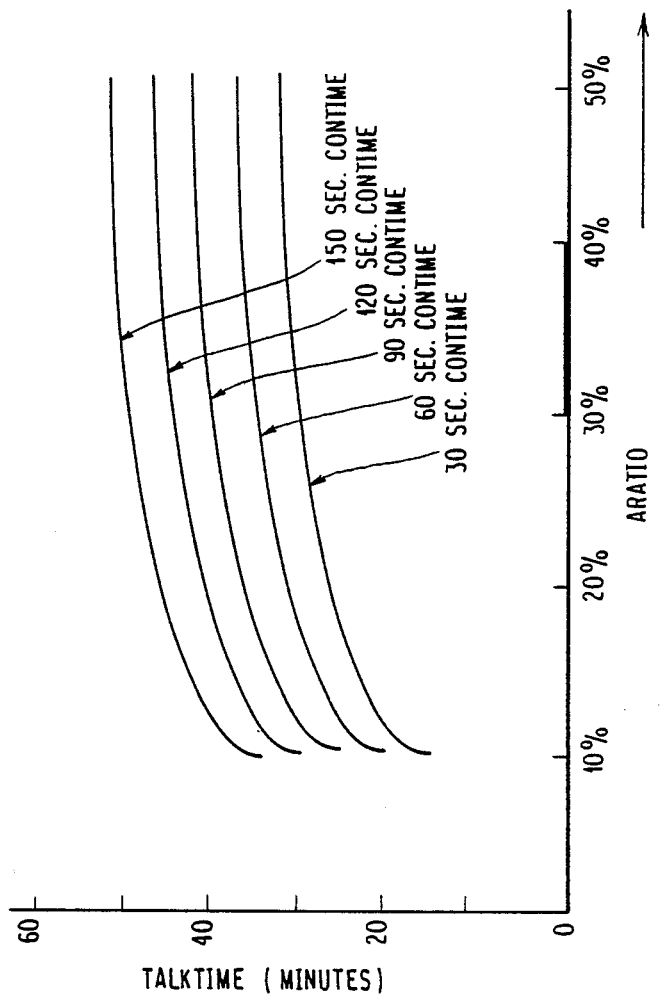
FIG. 4 is a family of graphs showing talk time as a function of the answer ratio for various values of connect, time at lowest speed for an eight station model.
Figure 5:
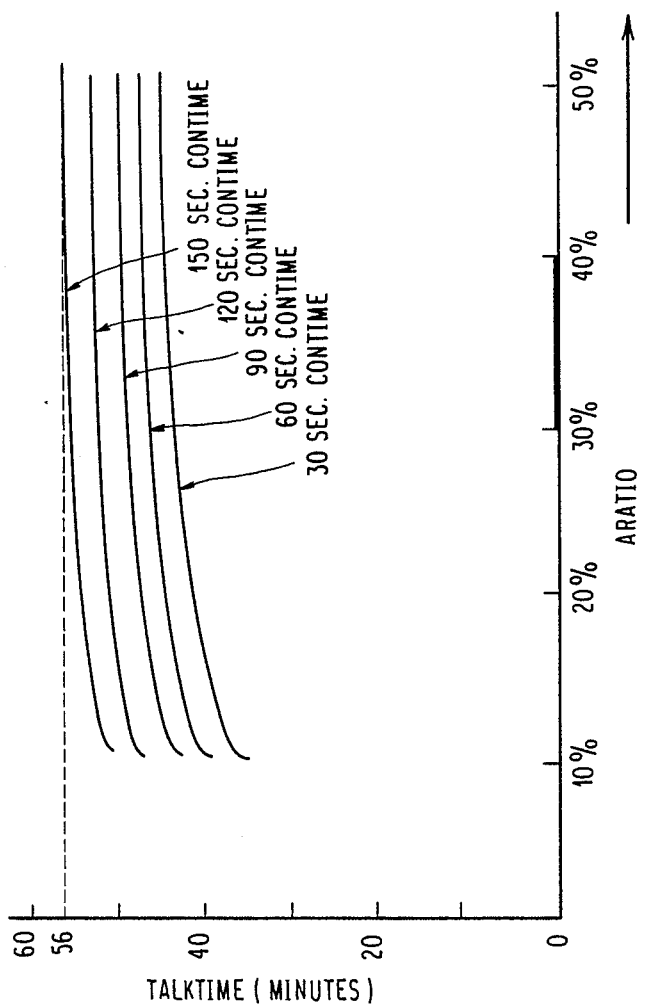
FIG. 5 is a family of graphs showing talk time as a function of the answer ratio for various of values of connect time at maximum speed for an eight station model.

FIG. 4 is a family of graphs illustrating the relation between talk time in minutes and the answer ratio ($A_{ratio}$) at lowest speed for an eight station system. These graphs show that as the $A_{ratio}$ increases, the talk time increases, but as the connect time ($CON_{time}$) decreases, the talk time decreases. On the other hand, the shorter the connect time, the greater will be the number of clients contacted. A similar relation holds for the system operating at maximum speed as shown in FIG. 5 except that the family of curves is shifted upwards indicating that the talk time has been maximized.

Figure 6:
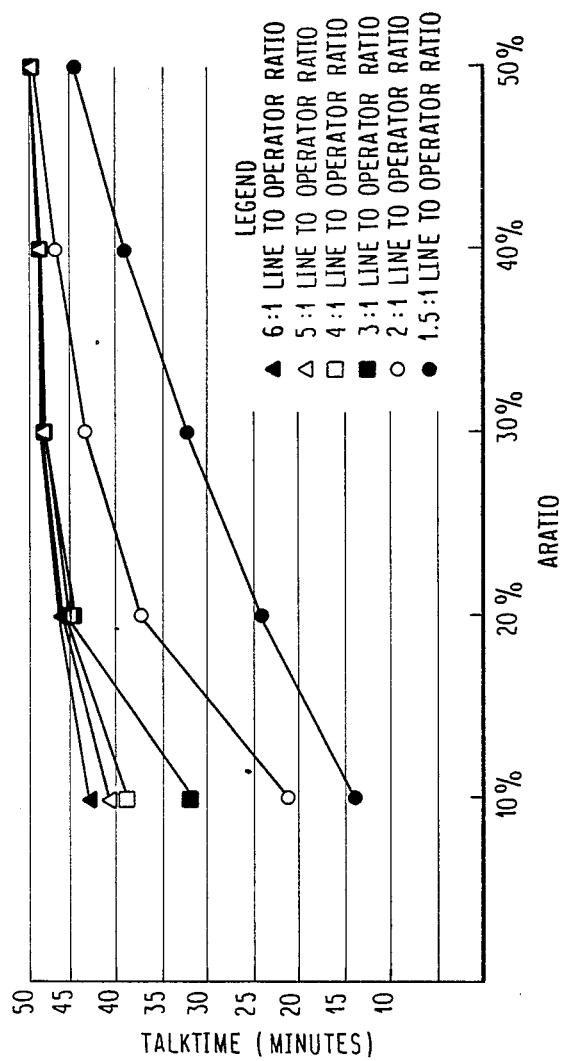
FIG. 6 is a family of graphs showing talk time as a function of the answer ratio for various line to operator ratios for a connect time of approximately 30 seconds.
Figure 7:
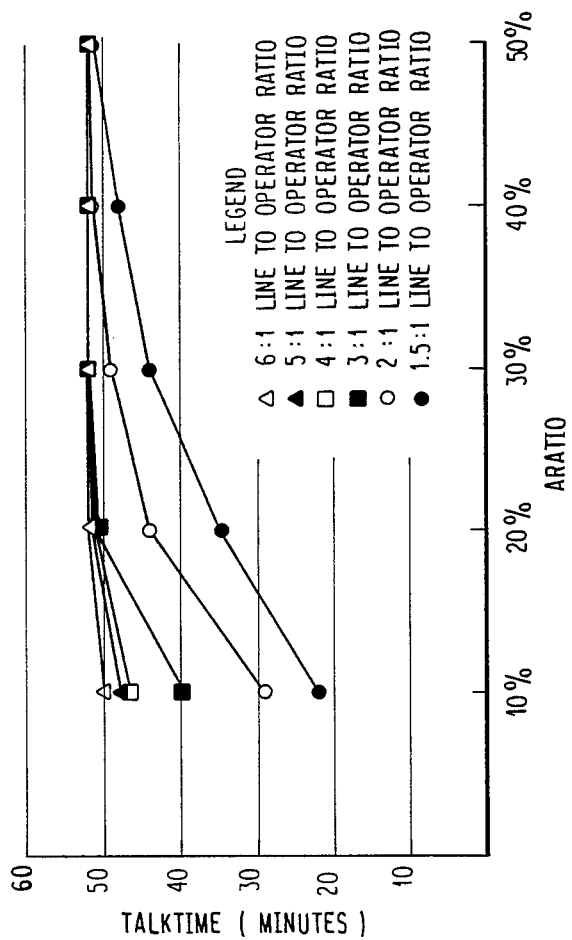
FIG. 7 is a family of graphs showing talk time as a function of the answer ratio for various line to operator ratios for a connect time of approximately 60 seconds.
Figure 8:
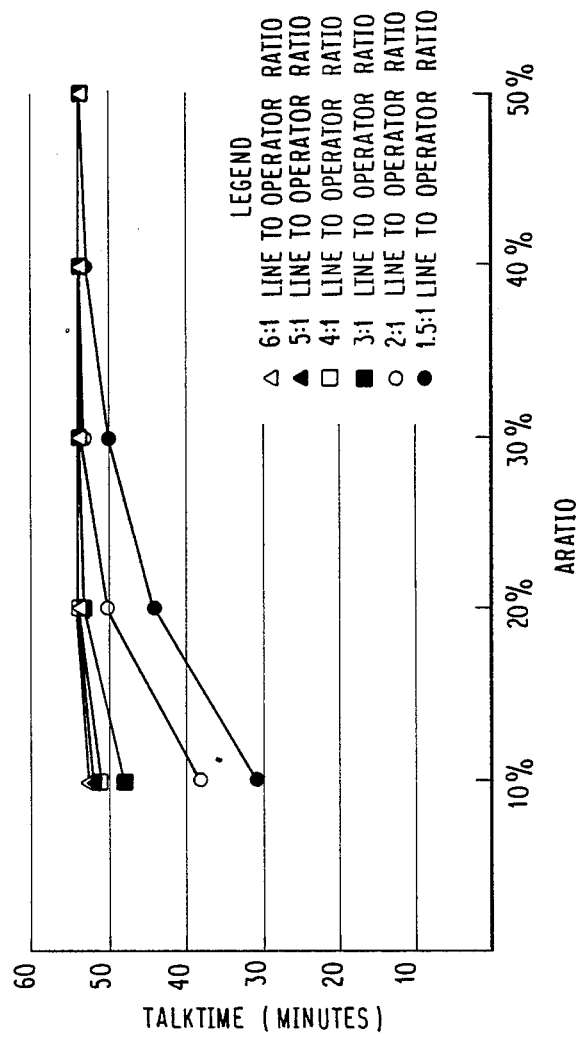
FIG. 8 is a family of graphs showing talk time as a function of the answer ratio for various line to operator ratios for a connect time of approximately 90 seconds.
Figure 9:
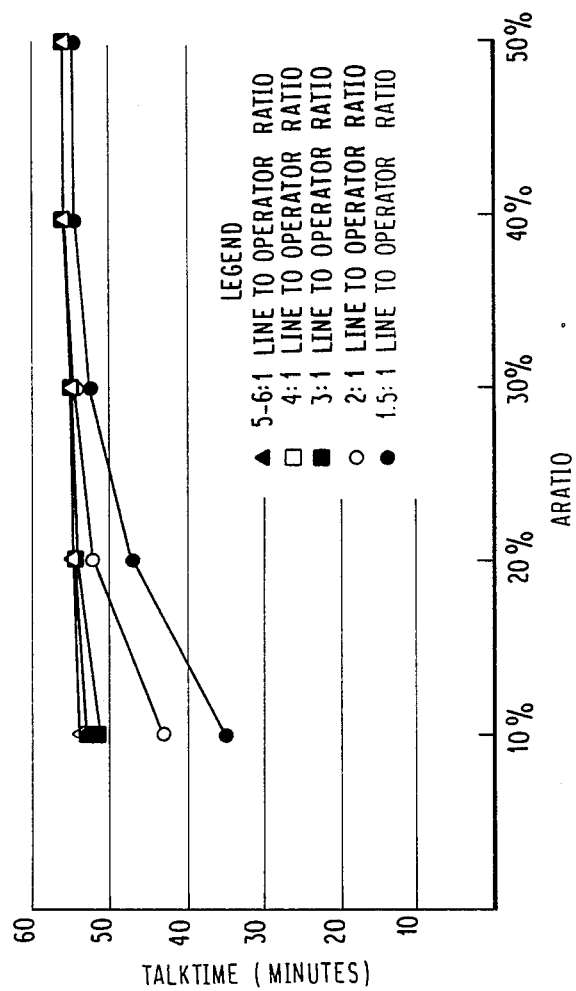
FIG. 9 is a family of graphs showing talk time as a function of the answer ratio for various line to operator ratios for a connect time of approximately 120 seconds.
Figure 10:
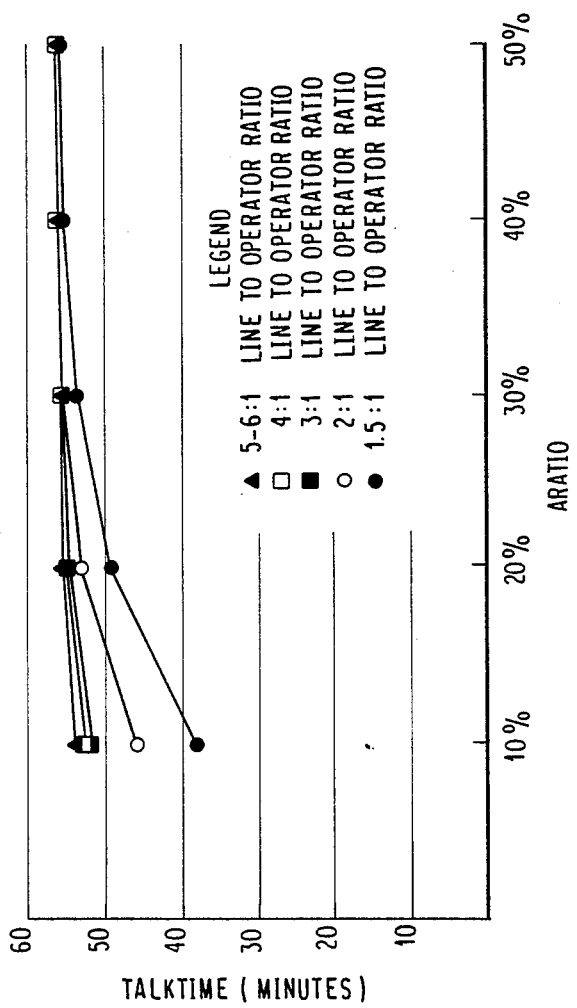
FIG. 10 is a family of graphs showing talk time as a function of the answer ratio for various line to operator ratios for a connect time of approximately 150 seconds.

FIG. 6 is a family of graphs which plots the talk time as a function of the answer ratio for different line to operator ratios and a connect time of 30 seconds. FIG. 7 is a similar family of graphs for a connect time of 60 seconds, and FIGS. 8, 9 and 10 are similar families of graphs for connect times of 90, 120 and 150 seconds, respectively. From these graphs, it is readily apparent that the higher the conversation time, the less number of lines are required to maintain a certain amount of talk time. For example, in FIG. 6, for a 20% answer ratio and a conversation time of 30 seconds, a 3:1 line to operator ratio is required to achieve approximately 44 minutes of talktime in an hour, but can be achieved with a 2:1 line to operator ratio for a conversation time of 60 seconds as shown in FIG. 7.

Figure 11:
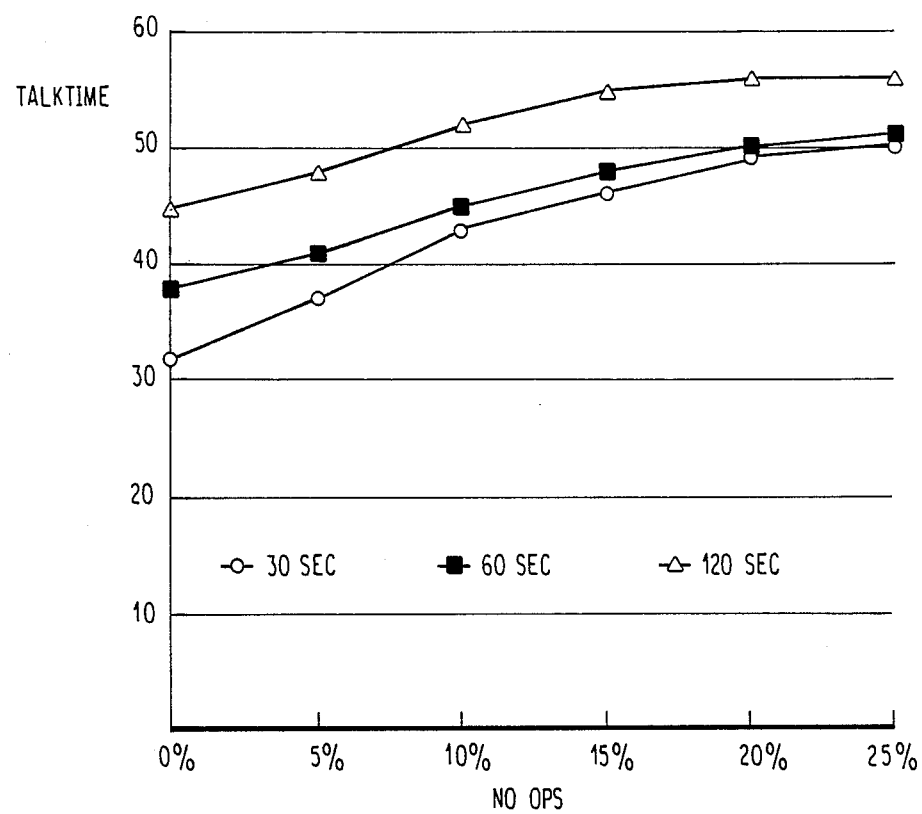
FIG. 11 is a family of graphs showing talk time as a function of a percentage of nuisance calls for various values of connect time.

FIG. 11 shows the talk time plotted as a function of the percentage of nuisance calls. The upper graph is for a conversation time of 120 seconds, the next graph is for a conversation time of 60 seconds, and the lower graph is for a conversation time of 30 seconds. It will be observed that a greater talk time can be achieved for a given level of nuisance calls the longer the conversation time. But as mentioned before, the longer the conversation time, the fewer number of clients will be contacted in a given period of time during the campaign. If the type of campaign has a high conversation time, there is no need to generate a high percentage of nuisance calls in order to achieve a high talk time.

Figure 12:
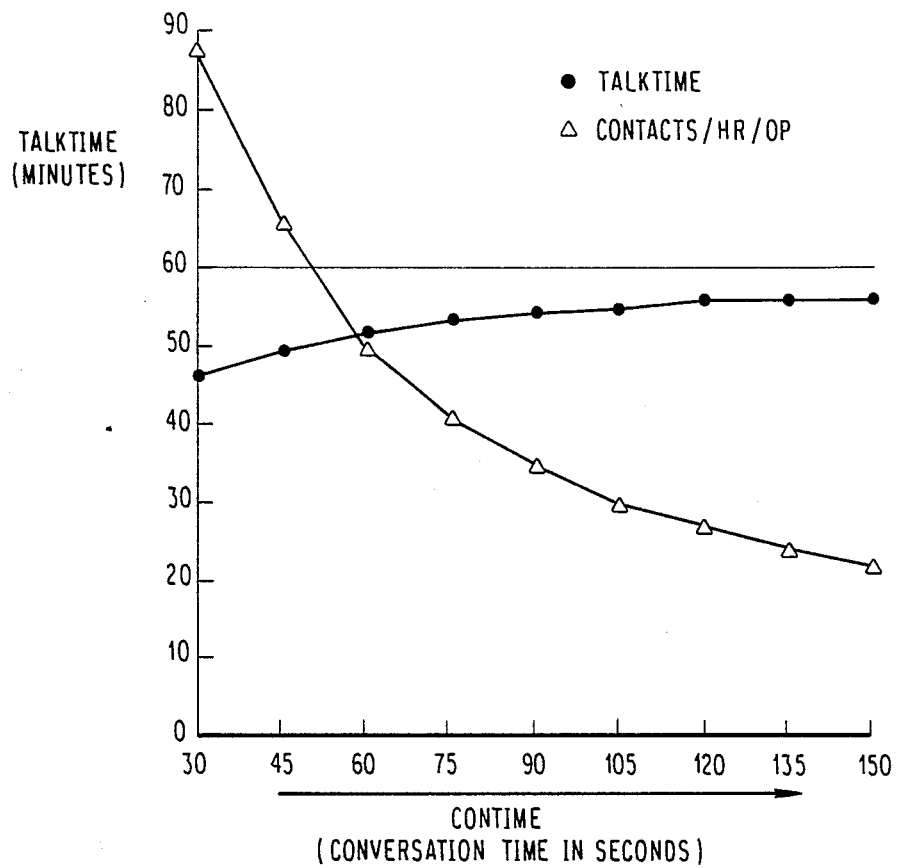
FIG. 12 is a graph showing contacts per hour per operator and talk time each plotted as functions of connect time.

FIG. 12 shows talk time plotted as a function of conversation time. It will be observed that this graph asymptotically approaches the 60 minute line as the conversation time increases. FIG. 12 also shows the number of contacts per hour per operator plotted as a function of conversation time. This curve decreases as a hyperbolic function as the conversation time increases, illustrating the divergent requirements of maximizing both talk time and the number of contacts per hour per operator in call origination management systems.

Figure 13:
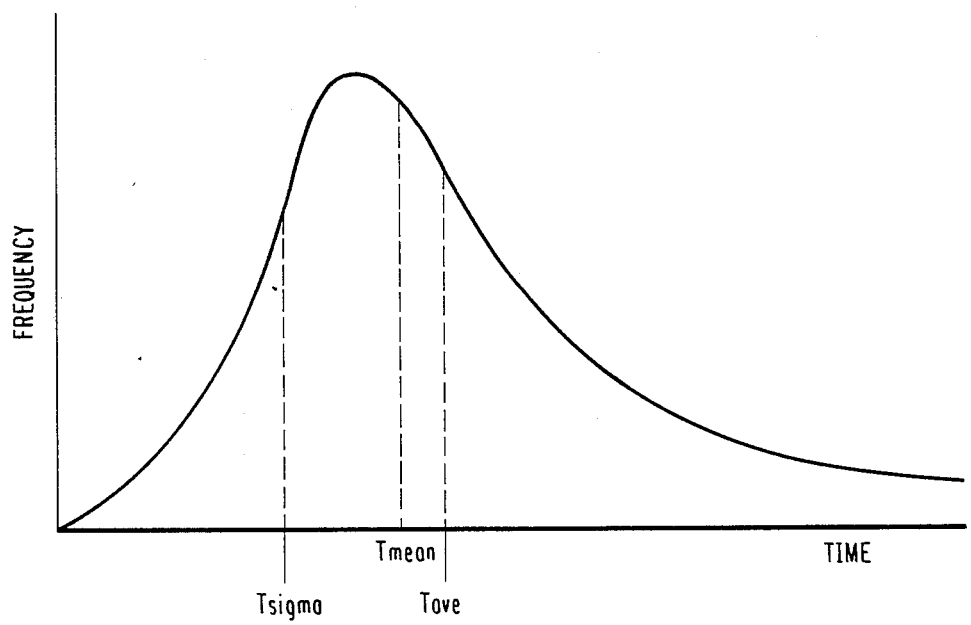
FIG. 13 is a graph showing the frequency of calls plotted as a function of the time of calls illustrating the mean time and standard deviation of time of calls during a session.

FIG. 13 shows a graph which plots the frequency of calls as a function of the times of the calls. This graph is typical of what has been observed in a specific class of call origination management systems; i.e., systems of the nonqueuing type. It will be observed that the graph is distorted to the right from a standard distribution or bell curve. As a result, the mean time, $T_{mean}$, deviates to the right from the average time, $T_{ave}$, by an amount defined as the standard deviation, represented by the Greek letter sigma. What this means simply is that while most calls are short, there are a significant number of calls which are long. Were the curve to be a standard distribution or bell curve, $T_{mean}$ and $T_{ave}$ would be the same, and for short connection applications, the standard deviation would be small.

Using the foregoing definitions, the number of call attempts per hour is computed as $$N \times \frac{3600}{T_{setup}},$$

and the number of connections per hour is computed as $$\frac{T_{talk} \times 60}{CON_{time}} \times OP_{num}.$$

Nonqueuing Algorithm

Now, according to the nonqueuing algorithm implemented by the present invention, the connect ratio is computed as follows:

$$CONN_{ratio} = \frac{T_{talk} \times 60}{CONN_{time}} \times OP_{num} \times \frac{T_{setup}}{N \times 3600},$$

but, by definition, the connect ratio is the difference of the answer ratio and the maximum number of nuisance calls, which is computed as follows:

$$A_{ratio} - NOP_{max} = \frac{Talk}{60} \times \frac{T_{setup}}{CONN_{time}} \times \frac{OP_{num}}{N}.$$

Setting the right hand side of these two equations equal to one another and solving for N, the following equation is obtained:

$$N = \frac{T_{talk}}{60} \times T_{setup} \times \frac{OP_{num}}{A_{ratio} - NOP_{max}}.$$

Thus, N is directly proportional to the setup time and the number of operators available and inversely proportional to the difference between answer ratio and the maximum number of nuisance calls allowable. It has been found by experimental tests, however, this relation needs to be modified to adjust for the $NOP_{ratio}$ which is given to the supervisor to vary depending on his or her application, as indicated by the following equation:

$$N = \frac{T_{setup}}{T_{mean} \pm (C_1 \times T_{sigma})} \times \frac{OP}{C_2 \times A_{ratio} - NOP_{max}}$$

The foregoing equation assumes $T_{talk} = 60$ minutes and takes into account the distortion of the curve illustrated in FIG. 13. $C_1$ and $C_2$ are constants which have been empirically determined. More specifically, $C_2$ is a function of $T_{mean}$, $A_{ratio}$ and $NOP_{ratio}$. $C_2$ is not defined as a mathematical function but is, instead, determined empirically and varies depending of how far the ratio of nuisance calls deviates from a set level. In a specific implementation, $C_2$ has three values depending on how far the number of nuisance calls deviates from the set value for $NOP_{max}$ and works as a pushup/pushdown factor (for maintaining the $NOP_{max}$).

Figure 14:
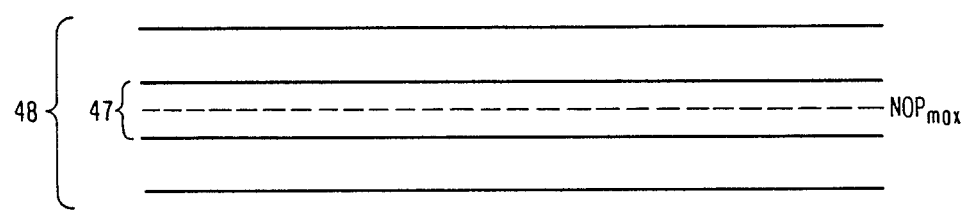
FIG. 14 is a graph illustrating the manner in which the value of a constant $C_1$ is determined as a relation with the maximum value of nuisance calls.

FIG. 14 illustrates the concept. The value $NOP_{max}$ is in the center of two bands 47 and 48, defining ranges of values for the number of nuisance calls, which is ±0.5%. It is desired to operate the system within band 47, and as long as this condition exists, $C_2$ *is a first empirically determined value. Should the number of nuisance calls go higher, falling into band* 48, $C_2$ is a second empirically determined value greater than the first value. Moreover, if the number of nuisance calls goes even higher, falling outside band 48, $C_2$ is an even larger value. The second constant $C_1$ may also be a function of the $T_{mean}$, $A_{ratio}$ and $NOP_{ratio}$, but it has been determined experimentally that setting the second constant equal to ±25% of $T_{sigma}$ provides good performance.

Figure 15A:
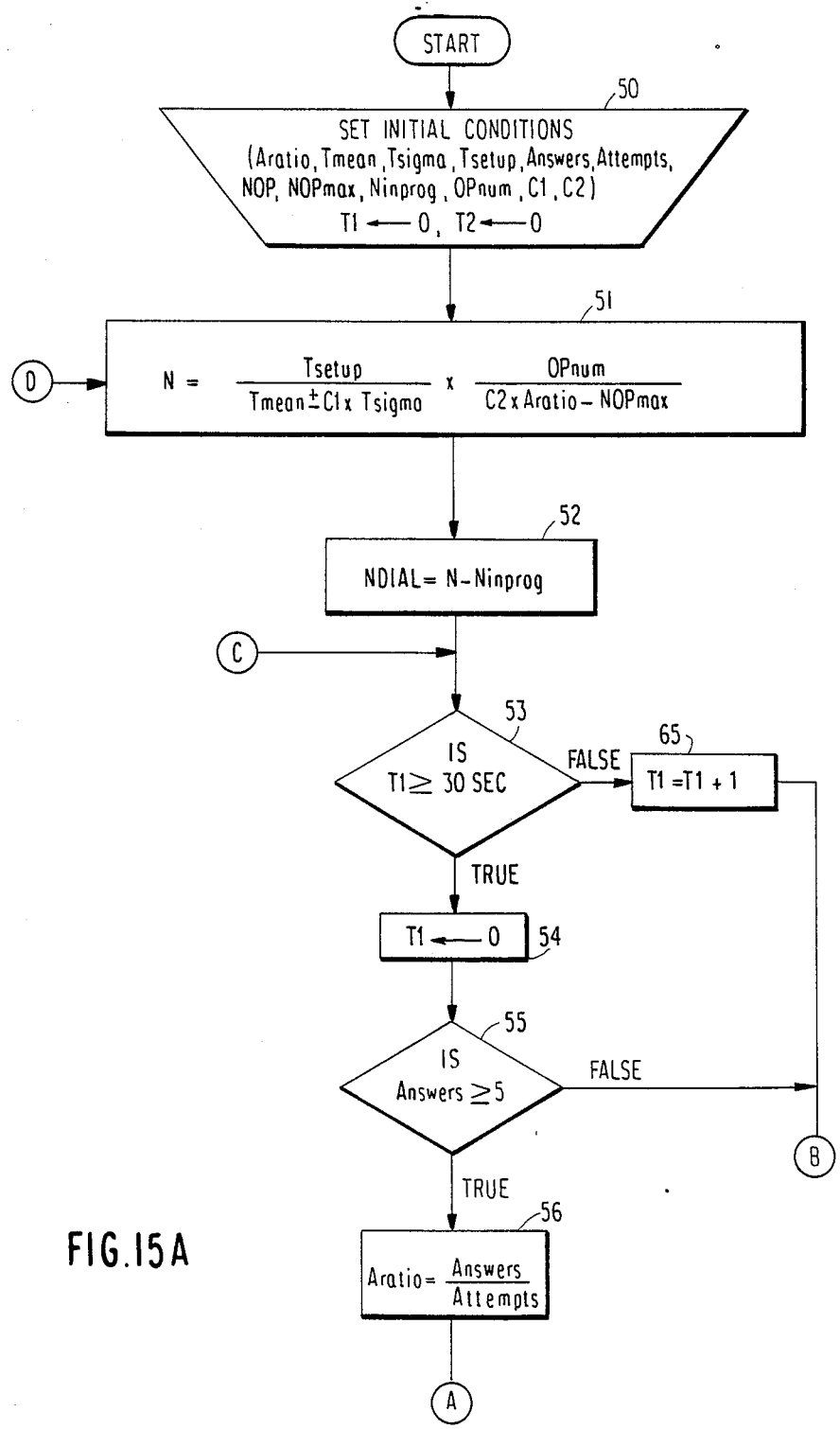
FIGS. 15A and 15B, taken together, are a flow chart showing the logic of an implementation of the new pacing algorithm according to the invention.
Figure 15B:
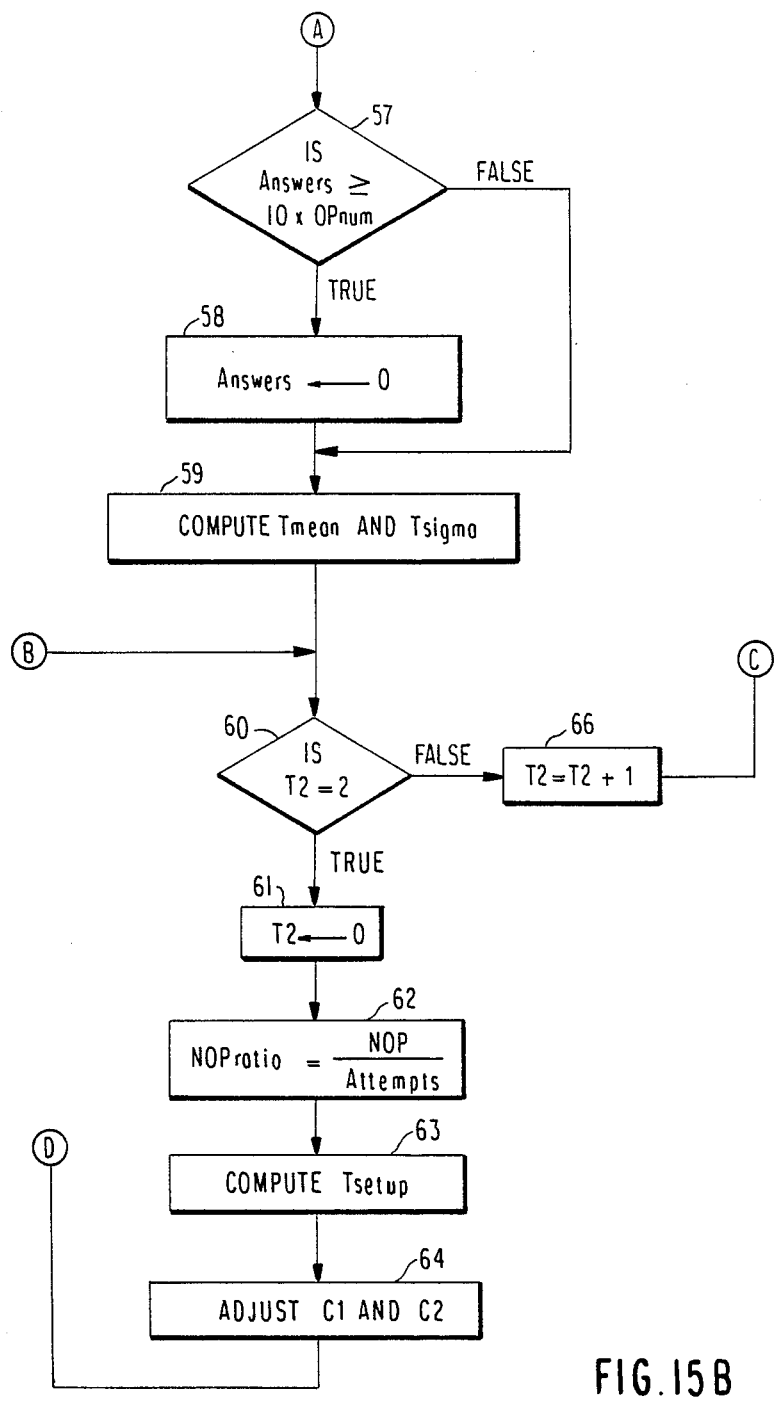

Referring now to FIGS. 15A and 15B of the drawings, there is shown a flow chart illustrating the logic which implements the algorithm. The process begins at 50 by setting initial conditions. These include the $A_{ratio}$, $T_{mean}$, $T_{sigma}$, $T_{setup}$, $C_1$, $C_2$, the $NOP_{max}$, $N_{inprogress}$, and the number of operators. Some of the values are default values which are set at the beginning of a campaign, but others such as the number of nuisance calls and the number of operators are specified by the supervisor. The actual values of the default values are good initial "guesses" based on empirically determined data from other, similar campaigns.

The number of calls is computed in function block 51. In the initial phase, this computation is based on the initial condition values, including the default values. The number of calls to dial is then determined in function block 52 as the number computed in function block 51 less the number of calls currently in progress. In decision block 53, a test is made to determine if 30 seconds have elapsed. 30 seconds is the duration of a phase. If 30 seconds have elapsed, the phase clock is reset to zero in function block 54, and a further test is made in decision block 55 to determine if the answers for the phase was greater than or equal to five, an empirically determined value. If so, the answer ratio is computed in function block 56 as the number of answers divided by the number of attempts. Then, in decision block 57, a test is made to determine if the number of answers for the phase is greater than or equal to ten times the number of operators logged on. Note again that ten is an empirically determined number. If so, the answers per phase is set to zero in function block 58, and in function block 59, the actual values for $T_{mean}$ and $T_{sigma}$ are computed based on the data accumulated for the preceding phase. Then in decision block 60, a test is made to determine if a two second clock has expired. The purpose of this two second clock is to minimize the load on the CPU. If so, the two second clock is reset in function block 61 and then, in function block 62, the nuisance call ratio is computed as the ratio of nuisance calls to the number of attempts. Now, the setup time is computed in function block 63, in function block 64, the constants $C_1$ and $C_2$ are adjusted The process then returns to function block 51 where, based on the adjusted values for constants $C_1$ and $C_2$, the number of calls to dial are again computed.

Going through the flow diagram again, if the test in decision block 53 is negative indicating that a phase has not yet timed out, the phase clock is incremented in function block 65 before the process jumps to decision block 60. If the test in decision block 55 is negative, the process jumps directly to decision block 60. Next, in decision block 57, if that test is negative, the process jumps directly to function block 59 where new values of $T_{mean}$ and $T_{sigma}$ are computed. Finally, if the test in decision block 60 is negative, the two second clock is incremented in function block 66 before the process loops back to decision block 53 to test the phase clock.

Queuing Algorithm

In a queuing system, there are by definition no nuisance calls. Instead, if there is no operator available when a call is answered, the call is routed to a source of a recorded message, an example of which is disclosed in copending application Ser. No. 07/027,240 for "Alternate Memory Addressing for Information Storage and Retrieval" filed by James J. Frimmel, Jr. et al. and assigned to the assignee of this application, now Pat. No. 4,875,157. It is desirable, however, to minimize the number of calls in the queue since, as the number of clients in the queue listening to the recorded message increases, the longer time each client will be in the queue and the greater the probability that a client in the queue will hang up. Therefore, the basic algorithm for the nonqueuing system is used with the modification that $NOP_{max}$ and $NOP_{ratio}$ are not used in the computations but, instead, the ratio of clients on hold to the number of call attempts.

Front and Back Operators Algorithm

The front and back operators applications can be considered to be a hybrid of the nonqueuing and queuing systems. More specifically, the front operators will make many contacts, each of which will be of short duration. Since the purpose of the front operator contact is to ask the client whether they will listen to a recorded message, the front operator part of the algorithm is essentially the same as the nonqueuing algorithm already described, although the nonqueuing algorithm may be used in some applications. The back operator part of the algorithm, on the other hand, is inherently a queuing algorithm since those clients who have agreed to listen to the recorded message may be considered to be in a queue for an available back operator.

To achieve the best performance, the invention uses a continuity model for the front and back operators algorithm. According to this continuity model, the rate of answered calls should be equal to the rate of calls finished, as is illustrated in the timing diagram of FIG. 16. Accordingly, the algorithm calculates the number of playing messages as follows:

$$msg\_stack\_length = \frac{msg\ length}{(ave\_expected\_duration\_front + ave\_expected\_duration\_back) * OPnum}$$

The message stack_length is the average number of messages to be required in order to keep the operators (front and back) busy all the time. The algorithm also calculates the number of calls to be dialed in the same way as the basic algorithm except that those who handle front calls in an adjustable mean time ($T_{fmean}$) and those who handle back calls are expected to be done in an adjustable mean time ($T_{bmean}$). Thus, the basic algorithm is modified to compute N as follows:

$$N = \frac{T_{setup}}{T_{fmean} \pm C_{1f} \times T_{fsigma}} + \frac{T_{setup}}{T_{bmean} \pm C_{1b} \times T_{bsigma}} \times \frac{OP_{num}}{C_2 \times A_{ratio} - NOP_{max}},$$

where $T_{fsigma}$ and $T_{bsigma}$ are the standard deviations associated with front and back operators, respectively, and the constants $C_{1f}$ and $C_{1b}$ are functions of those standard deviations.

The number of clients on hold for front and back is subtracted from the total calculated number to dial. More specifically, $$N_{DIAL} = N - (N_{inprog} + N_{fhold} + N_{bhold}),$$

where $N_{fhold}$ and $N_{bhold}$ are the number of clients on hold for front and back operators, respectively. Obviously, if a nonqueuing algorithm is used for front operators, $N_{fhold}$ would be zero.

The size of the message queue is directly related to the number of answered calls and, consequently, the number of clients who have listened to a message may grow. If that number exceeds the message queue length, the system stops dialing.

Figure 17A:
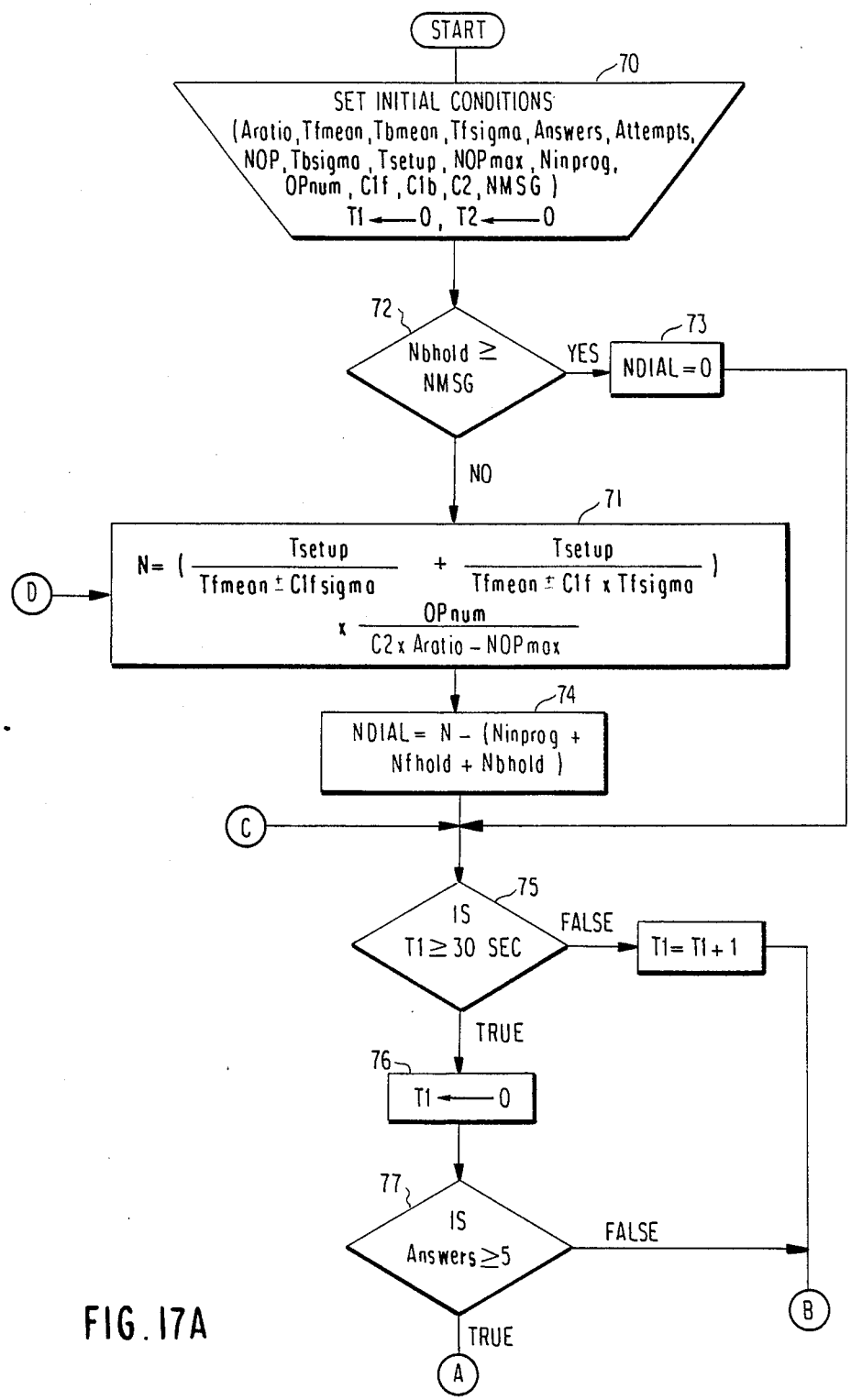
FIG. 17A and 17B, taken together, are a flow chart showing the logic of an implementation of the front and back algorithm.
Figure 17B:
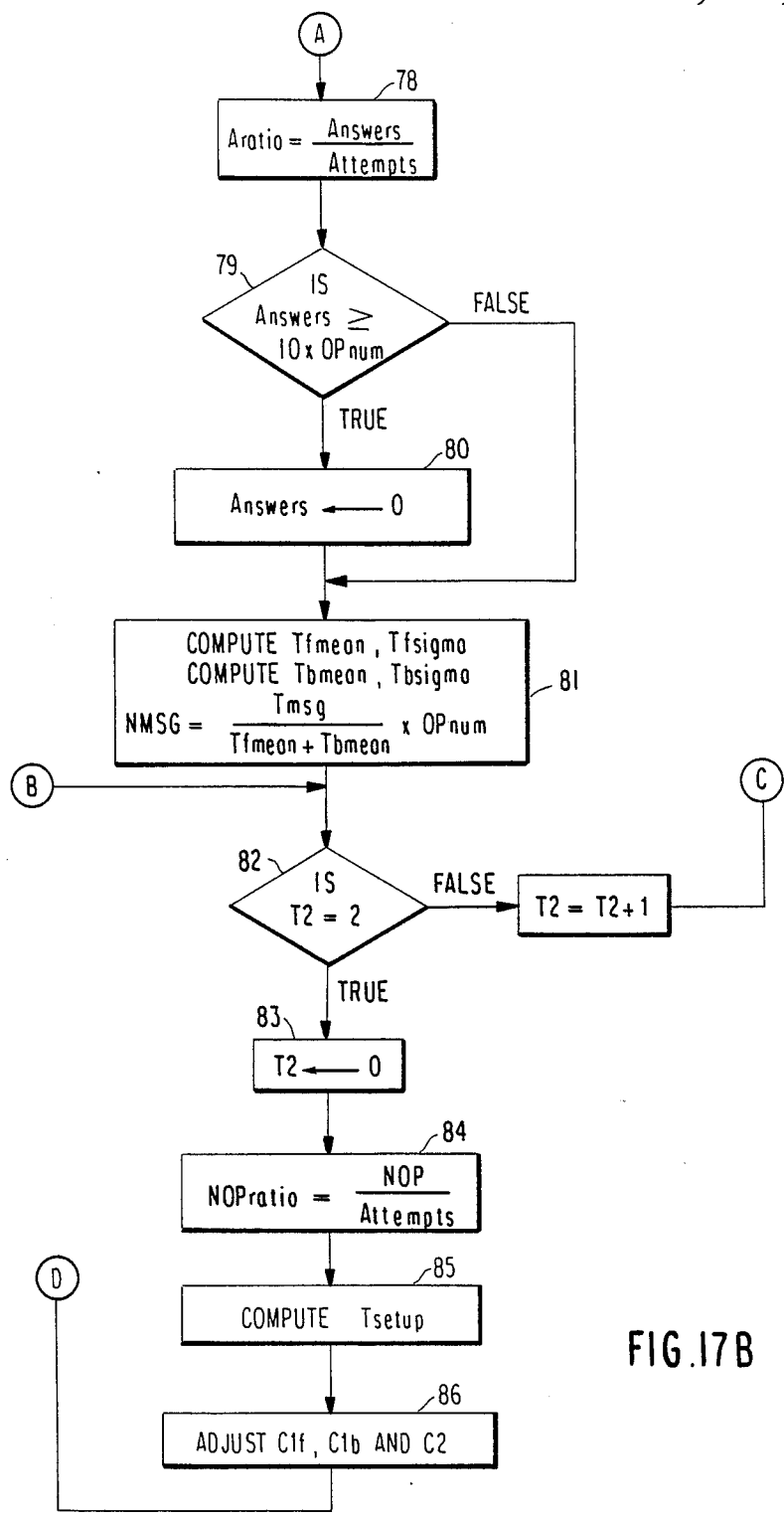

Referring now to FIGS. 17A and 17B of the drawings, there is shown a flow chart illustrating the logic which implements the front and back operators algorithm. The process begins at 70 by setting initial conditions. These include the $A_{ratio}$, $T_{fmean}$, $T_{bmean}$, $T_{fsigma}$, $T_{bsigma}$, $T_{setup}$, $C_{1f}$, $C_{1b}$, $C_2$, the $NOP_{max}$, $N_{inprogress}$, and the number of operators. Again, some of the values are default values which are set at the beginning of a campaign, but others such as the number of nuisance calls and the number of operators are specified by the supervisor.

The number of calls is computed in function block 71. In the initial phase, this computation is based on the initial condition values, including the default values. A test is made in decision block 72 to determine if the number of clients currently listening to the recorded message equals the message que. If so, no more calls should be made. Thus, in function block 73 the dialing operation is interrupted and the process goes into a holding loop. When the number of clients currently listening to the recorded message is less than the message que, then the process continues.

The number of calls to dial is then determined in function block 74 as the number computed in function block 71 less the sum of the number of calls currently in progress, the number of clients on hold for a front operator (in a front queuing system) and the number of clients currently listening to the recorded message. Obviously, if a front queuing system is not being used (i.e., the basic nonqueuing algorithm is being used), then $N_{fhold}$ is not used. In decision block 75, a test is made to determine if 30 seconds have elapsed. If 30 seconds have elapsed, the phase clock is reset to zero in function block 76, and a further test is made in decision block 77 to determine if the answers for the phase was greater than or equal to five. If so, the answer ratio is computed in function block 78 as the number of answers divided by the number of attempts. Then, in decision block 79, a test is made to determine if the number of answers for the phase is greater than or equal to ten times the number of operators logged on. If so, the answers per phase is set to zero in function block 80, and in function block 81, the actual values for $T_{fmean}$, $T_{bmean}$, $T_{fsigma}$, and $T_{bsigma}$ are computed based on the data accumulated for the preceding phase. Then in decision block 82, a test is made to determine if a two second clock has expired. If so, the two second clock is reset in function block 83 and then, in function block 84, the nuisance call ratio is computed as the ratio of nuisance calls to the number of attempts. Now, the setup time is computed in function block 85, in function block 64, the constants $C_{1f}$, $C_{1b}$ and $C_2$ are adjusted The process then returns to function block 71 where, based on the adjusted values for constants $C_{1f}$, $C_{1b}$ and $C_2$, the number of calls to dial are again computed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of adaptively pacing telephone calls in a call origination management system comprising the steps of:
    determining a number of calls to dial as an inverse function of a mean time of all calls and a standard deviation of the mean time multiplied by a first constant, said number of calls to dial also being an inverse function of a second constant times a ratio of answered calls to attempts per session;
    dialing a number of calls according to the determined number of calls to dial;
    computing new values of said ratio of answered calls to attempts per session, said mean time and said standard deviation; and
    using said new values in repeating the step of determining the number of calls to dial.

2. The method of adaptively pacing telephone calls as recited in claim 1 further comprising the step of reducing the determined number of calls to dial by a number of calls in progress.

3. The method of adaptively pacing telephone calls as recited in claim 1 wherein said first constant is ±0.25 of said standard deviation.

4. The method of adaptively pacing telephone calls as recited in claim 1 further comprising the step of adjusting values of said first and second constants after computing said new values, the adjusted values of said first and second constants being used when repeating said step of determining the number of calls to dial.

5. The method of adaptively pacing telephone calls as recited in claim 4 further comprising the step of reducing the determined number of calls to dial by a number of calls in progress.

6. The method of adaptively pacing telephone calls as recited in claim 1 further comprising the step of reducing the product of said second constant and the ratio of answered calls to the call attempts per session by a preset number of a maximum allowable number of nuisance calls, said nuisance calls being calls which are answered for which there is no operator available.

7. The method of adaptively pacing telephone calls as recited in claim 6 further comprising the step of computing a ratio of nuisance calls to the call attempts per session, said ratio being used to adjust the value of said second constant.

8. The method of adaptively pacing telephone calls as recited in claim 7 wherein said first constant is ±0.25 of said standard deviation.

9. The method of adaptively pacing telephone calls as recited in claim 7 further comprising the step of adjusting values of said first and second constants after computing said new values, the adjusted values of said first and second constants being used when repeating said step of determining the number of calls to dial.

10. The method of adaptively pacing telephone calls as recited in claim 9 further comprising the step of reducing the determined number of calls to dial by a number of calls in progress.

11. The method of adaptively pacing telephone calls as recited in claim 1 wherein said call origination system includes a source of recorded message, said method further comprising the step of connecting an answered call to said source of recorded message whenever an operator is not available, but when an operator becomes available, connecting the answered call to the available operator.

12. The method of adaptively pacing telephone calls as recited in claim 11 further comprising the step of adjusting values of said first and second constants after computing said new values, the adjusted values of said first and second constants being used when repeating said step of determining the number of calls to dial.

13. The method of adaptively pacing telephone calls as recited in claim 12 further comprising the step of reducing the determined number of calls to dial by a number of calls in progress.

14. The method of adaptively pacing telephone calls as recited in claim 1 wherein said call origination management system routes calls to front operators and back operators, said front operators connecting those answered calls in which clients express an interest in hearing a recorded message to a source of recorded message and said back operators being connected to those clients who have heard the recorded message, said method further comprising the step of separately computing the mean time and the standard deviation of the mean time for each of said front and back operators.

15. The method of adaptively pacing telephone calls as recited in claim 14 further comprising the step of testing to determine if the number of clients currently listening to the recorded message is equal to a maximum queue for the message and, if so, temporarily suspending said step of dialing said calls.

16. The method of adaptively pacing telephone calls as recited in claim 14 wherein said call origination system includes a second source of recorded message, said method further comprising the step of connecting an answered call to said second source of recorded message whenever a front operator is not available, but when a front operator becomes available, connecting the answered call to the available front operator.

17. The method of adaptively pacing telephone calls as recited in claim 14 further comprising the step of adjusting values of said first constant for each of said front and back operators and adjusting said second constant after computing said new values, the adjusted values of said first and second constants being used when repeating said step of determining the number of calls to dial.

18. The method of adaptively pacing telephone calls as recited in claim 17 further comprising the step of reducing the determined number of calls to dial by a number of calls in progress.

* * * * *